United States Patent
Micallef

(10) Patent No.: US 11,338,931 B2
(45) Date of Patent: May 24, 2022

(54) HIGH VISIBILITY PANEL LATCH

(71) Applicant: ROHR, INC., Chula Vista, CA (US)

(72) Inventor: Steven Micallef, Chula Vista, CA (US)

(73) Assignee: ROHR, INC., Chula Vista, CA (US)

(*) Notice: Subject to any disclaimer, the term of this patent is extended or adjusted under 35 U.S.C. 154(b) by 697 days.

(21) Appl. No.: 16/197,096

(22) Filed: Nov. 20, 2018

(65) Prior Publication Data

US 2020/0156799 A1 May 21, 2020

(51) Int. Cl.
*B64D 29/06* (2006.01)
*E05B 41/00* (2006.01)
*E05C 19/14* (2006.01)
*B64D 29/02* (2006.01)

(52) U.S. Cl.
CPC .............. *B64D 29/06* (2013.01); *E05B 41/00* (2013.01); *E05C 19/145* (2013.01); *E05Y 2900/502* (2013.01)

(58) Field of Classification Search
CPC ........ E05C 19/145; E05B 41/00; B64D 29/06
See application file for complete search history.

(56) References Cited

U.S. PATENT DOCUMENTS

| | | | | |
|---|---|---|---|---|
| 2,783,072 | A * | 2/1957 | Sessler ................... | B64D 29/06 292/256 |
| 4,679,750 | A * | 7/1987 | Burhans ................. | B64D 29/06 244/129.4 |
| 6,824,175 | B2 * | 11/2004 | Porte ...................... | B64D 29/06 244/129.4 |
| 7,008,522 | B2 | 3/2006 | Boucard et al. | |
| 9,452,445 | B2 | 9/2016 | Frankenberger | |
| 10,047,549 | B2 * | 8/2018 | Grant ........................ | E05B 5/00 |
| 10,710,736 | B2 * | 7/2020 | Fleming ............. | B64D 45/0005 |
| 2005/0045767 | A1 * | 3/2005 | Halin ........................ | E05C 3/06 244/129.3 |
| 2009/0173823 | A1 * | 7/2009 | Shetzer ................... | B64D 29/06 244/129.4 |
| 2010/0006701 | A1 * | 1/2010 | Gallego Pleite ....... | B64D 29/06 244/129.4 |
| 2014/0030079 | A1 | 1/2014 | Provost et al. | |
| 2015/0110619 | A1 * | 4/2015 | Bulin ..................... | B64D 29/06 415/213.1 |
| 2015/0300061 | A1 * | 10/2015 | Fabre ..................... | B64D 29/06 292/113 |
| 2016/0264250 | A1 * | 9/2016 | Hernandez ............. | B64D 29/06 |
| 2016/0280383 | A1 * | 9/2016 | Lee ......................... | B64D 29/06 |
| 2016/0280384 | A1 * | 9/2016 | Aten ...................... | B64D 29/06 |
| 2018/0128028 | A1 * | 5/2018 | Hernandez ............ | E05C 19/145 |
| 2018/0171664 | A1 * | 6/2018 | Frommer ............... | B64D 29/06 |

FOREIGN PATENT DOCUMENTS

GB      2267122 A * 11/1993 ............. B64D 29/06
WO      2012155020       11/2012

OTHER PUBLICATIONS

European Patent Office, European Search Report dated Apr. 6, 2020 in Application No. 19210450.3.

* cited by examiner

*Primary Examiner* — Christine M Mills
*Assistant Examiner* — Tal Saif
(74) *Attorney, Agent, or Firm* — Snell & Wilmer L.L.P.

(57) ABSTRACT

A high visibility panel latch may comprise a latch handle coupled to a latch mechanism, wherein the latch handle comprises a visibility feature. The visibility features may comprise a portion of at least a first face and a second face of the latch handle. The visibility features may comprise a painted channel.

19 Claims, 8 Drawing Sheets

HIGH VISIBILITY PANEL LATCH

FIELD

The present disclosure relates to aircraft latch mechanisms, and, more specifically, to systems and methods for enhancing visibility of latch handles.

BACKGROUND

Aircraft often have one or more exterior latch handles configured to lay flush with the aerodynamic surface of the aircraft when in a latched state and to extend above the aerodynamic surface when in an unlatched state. Latch handles comprise painted portions tending thereby tend to increase visibility and provide a visual indicator of the latch state. Painted latch handle surfaces may abrade or otherwise degrade over time tending thereby to decrease the effectiveness of the painted surface as a visual indicator of latch state. Furthermore, painted portions of the latch handle may tend to chip or flake from operational contact tending thereby to generate foreign object debris which may pose a hazard to aircraft operations.

SUMMARY

In various embodiments, a high visibility panel latch may comprise a latch handle coupled to a latch mechanism, wherein the latch handle comprises visibility features. The visibility features may comprise a portion of at least a first face and a second face of the latch handle. The latch mechanism may include a plurality of links configured to articulate a hook body, wherein a link pivots about a hollow axle in response to pulling the latch handle. The visibility features may comprise at least one of a painted portion, an etched portion, a hard coat, an anodized portion, a dyed portion, a passivated portion, or an ablated portion. The visibility features may comprise a paint filled channel. The visibility features may comprise a paint filled circular feature In various embodiments, the visibility features comprise a paint filled pattern of shapes. In various embodiments, the visibility features comprise a paint filled elliptical channel. In various embodiments, the visibility features comprise an insert cutout having an insert material disposed within the insert cutout.

In various embodiments, an engine nacelle may comprise a first cowl panel, a second cowl panel, and a high visibility panel latch configured to removably couple the first cowl panel and the second cowl panel comprising a latch handle coupled to a latch mechanism, wherein the latch handle comprises a visibility feature, wherein the visibility features comprise a portion of at least a first face and a second face of the latch handle.

In various embodiments, the latch mechanism includes a plurality of links configured to articulate a hook body, wherein a link pivots about a hollow axle in response to pulling the latch handle, wherein the latch handle further comprises a trigger mechanism configured to expose a portion of the latch handle comprising the visibility features relatively above an aerodynamic panel surface in response to depressing a trigger plate. In various embodiments, a portion of the latch handle comprising the visibility features is exposed above an aerodynamic panel surface in response to pulling the latch handle. In various embodiments, the visibility features comprise a paint filled channel. In various embodiments, the visibility features comprise a paint filled circular feature. In various embodiments, the visibility features comprise a paint filled pattern of shapes. In various embodiments, the visibility features comprise a paint filled elliptical channel. In various embodiments, the visibility features comprise an insert cutout having an insert material disposed within the insert cutout.

In various embodiments, an aircraft may comprise an aerodynamic surface and a high visibility panel latch comprising a latch handle coupled to a latch mechanism wherein the latch handle comprises a first face and a second face disposed relatively below the aerodynamic surface, each of the first face and the second face comprising a portion having visibility features, wherein in response to transitioning the latch mechanism from a latched state to an unlatched state the visibility features are disposed relatively above the aerodynamic surface. In various embodiments, the visibility features comprise a paint filled channel. In various embodiments, the visibility features comprise a paint filled circular feature. In various embodiments, the visibility features comprise a paint filled pattern of shapes. In various embodiments, the visibility features comprise an insert cutout having an insert material disposed within the insert cutout.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
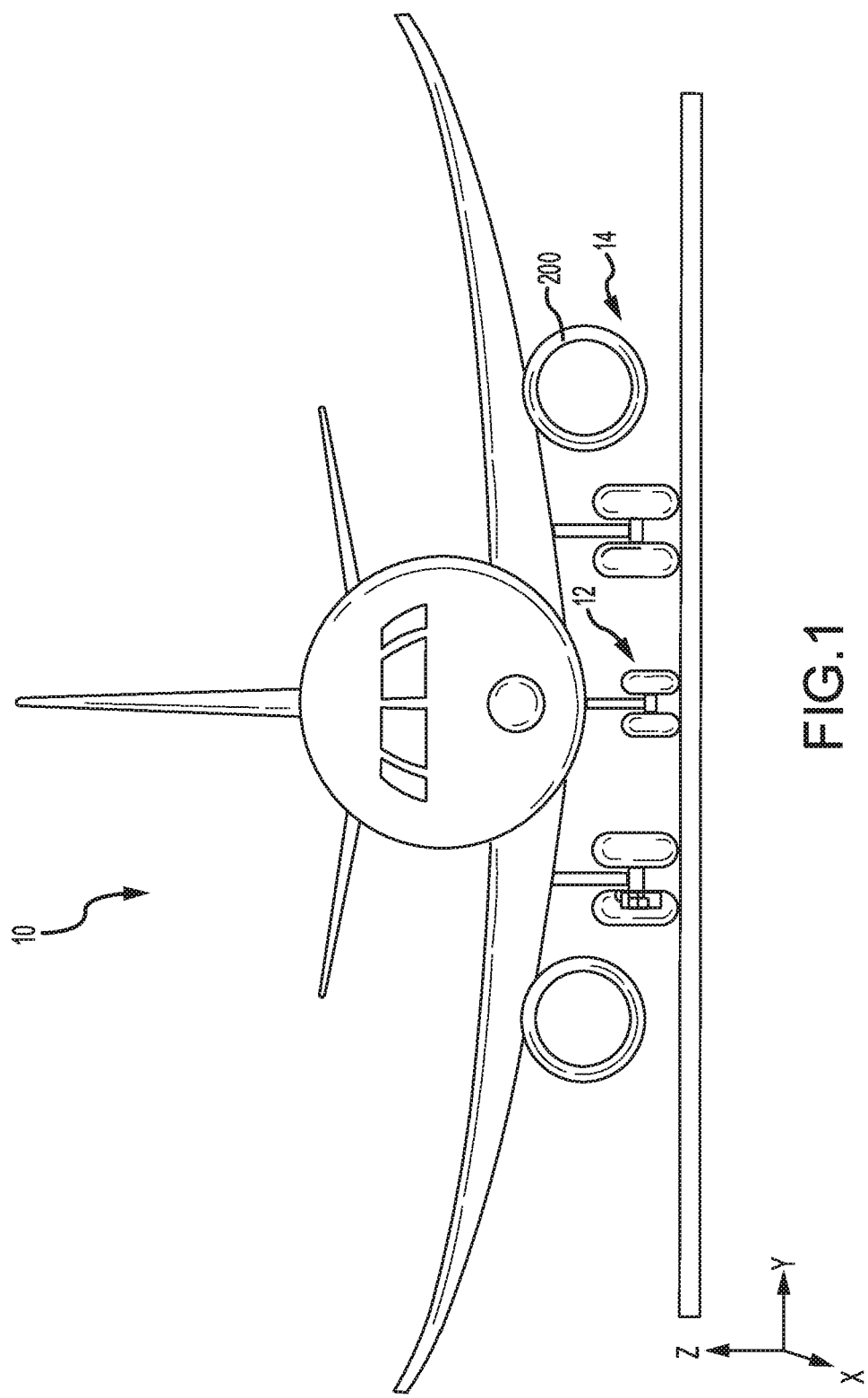
FIG. 1 illustrates an aircraft, in accordance with various embodiments.

With reference to FIG. 1, an aircraft 10 in accordance with various embodiments may comprise aircraft systems, for example, one or more landing gear such as landing gear 12, which may generally support aircraft 10 when aircraft 10 is not flying, allowing aircraft 10 to taxi, take off, and land without damage. Aircraft 10 may include one or more engines 14 housed in nacelles such as nacelle 200. Nacelle 200 and aircraft 10 may comprise a plurality of aerodynamic panels (e.g., core cowl panels, thrust reverser panels, fan cowl panels, etc.) which may be removable, hinged, or otherwise configurable to enable access to internal components of aircraft 10 and nacelle 200.

Figure 2:
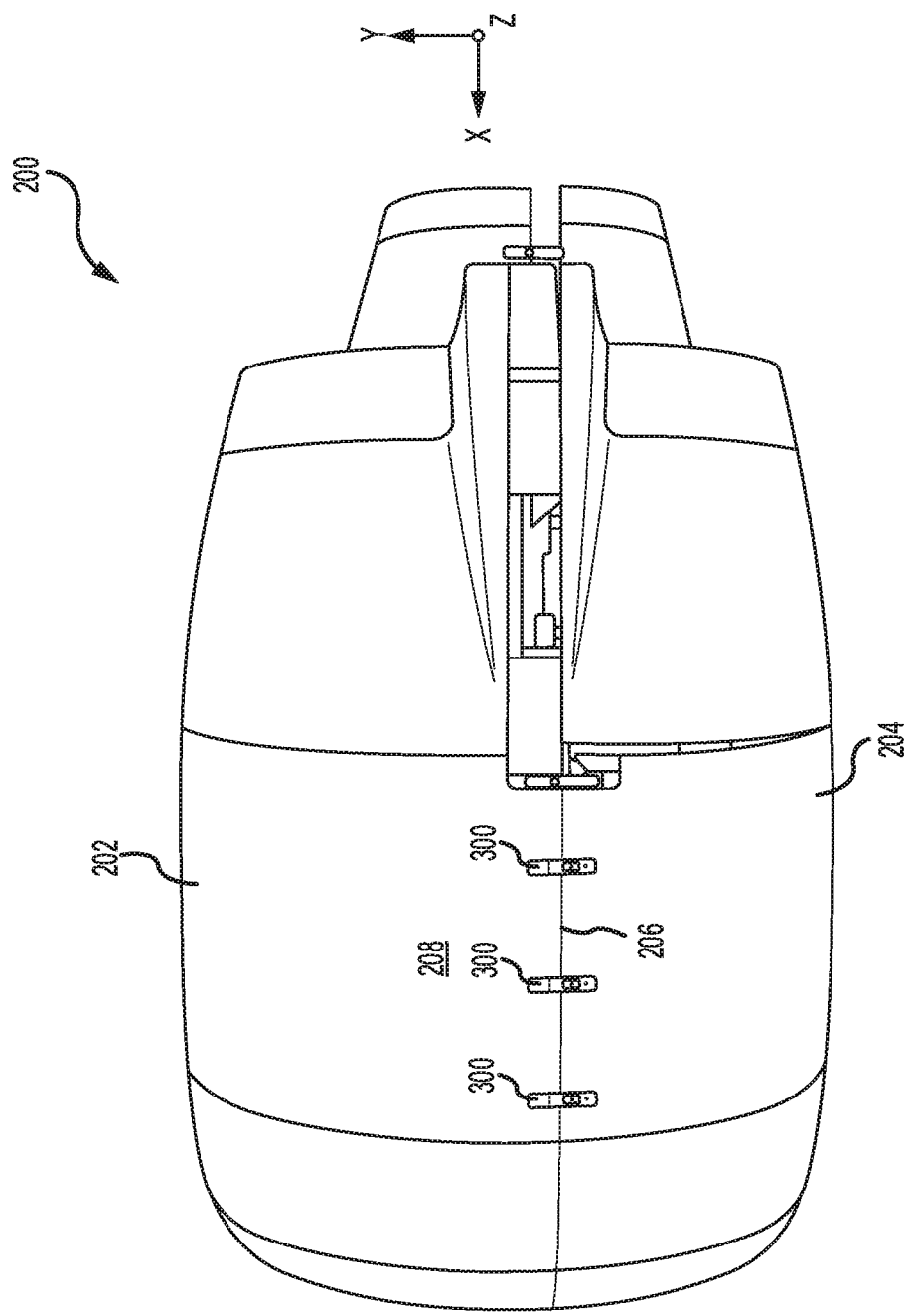
FIG. 2 illustrates an engine nacelle of an aircraft, in accordance with various embodiments.

In various embodiments and with additional reference to FIG. 2, nacelle 200 of aircraft 10 is illustrated. Nacelle 200 includes a first cowl panel 202 and a second cowl panel 204 which are coupled along seam 206 by a plurality of high visibility panel latches 300. In the latched state, a latch handle of high visibility panel latches 300 may sit relatively flush or may be recessed relatively below (along the Z-axis) aerodynamic panel surface 208. In the unlatched state a latch handle of high visibility panel latches 300 may protrude relatively above (along the Z-axis) aerodynamic panel surface 208. In this regard, a latch handle of a high visibility panel latch 300 may provide a visual indicator of the latch state (i.e., latched or unlatched).

Figure 3A:
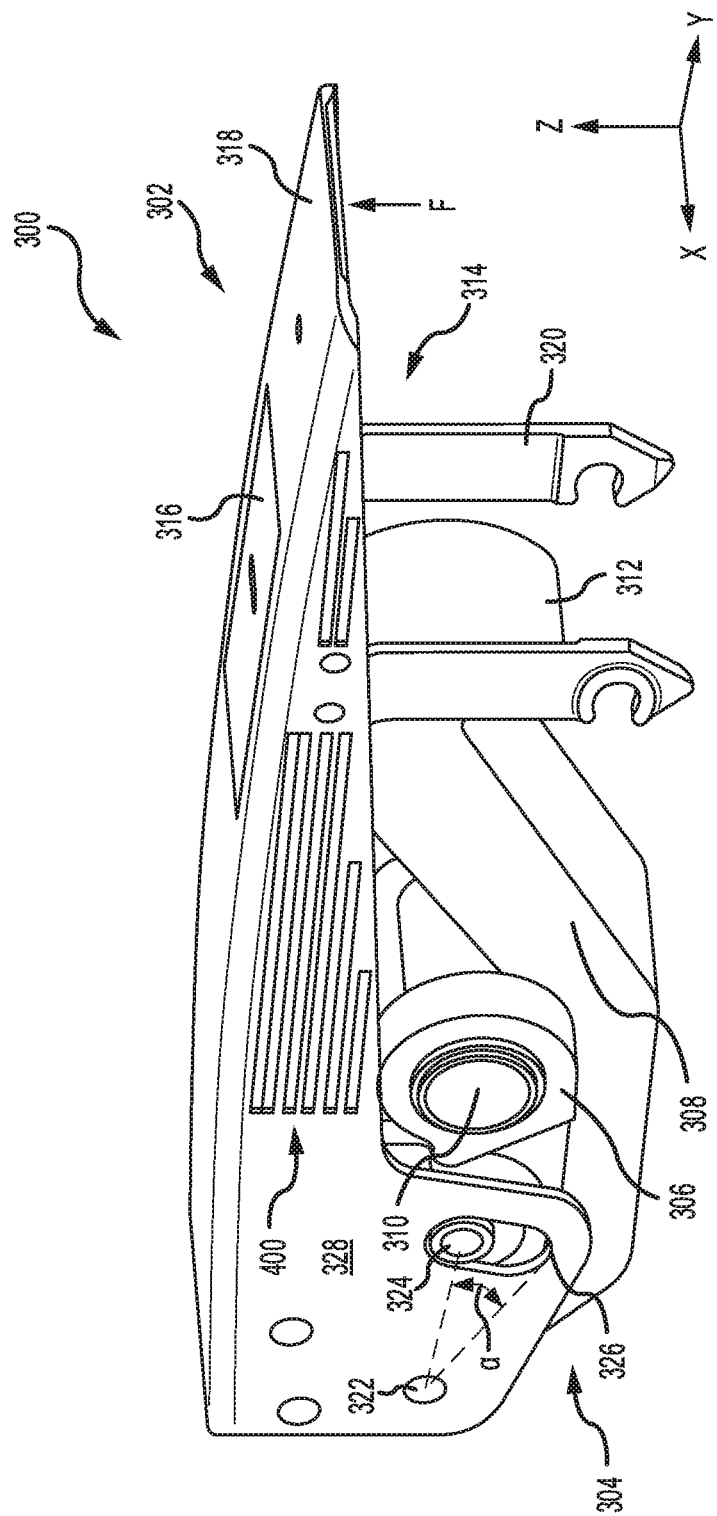
FIG. 3A illustrates a high visibility panel latch, in accordance with various embodiments.
Figure 3B:
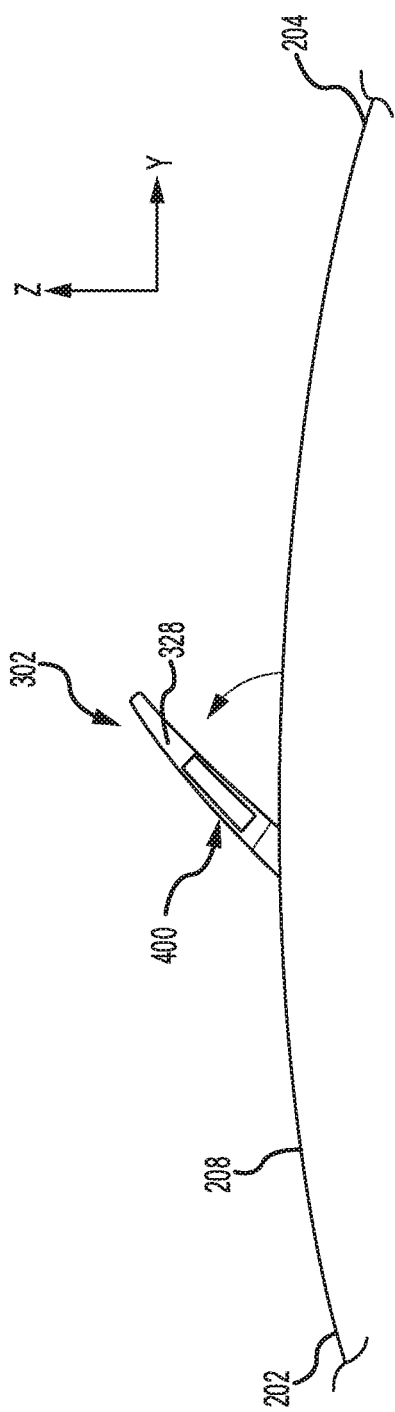
FIG. 3B illustrates a latch handle of a high visibility panel latch, in accordance with various embodiments.

With additional reference to FIGS. 3A and 3B, a high visibility panel latch 300 is illustrated in accordance with various embodiments. The high visibility panel latch 300 comprises a latch handle 302 coupled to a latch mechanism 304 including links 306 which articulate a hook body 308. Latch handle 302 includes an upper surface 318 extending between a first face 328 and a second face 330 to define, in cross section through the ZX plane, a relatively u-shaped latch handle. Hook body 308 may comprise a hook 312 configured to removably couple with a mating pin coupled to a cowl panel such as second cowl panel 204. Links 306 may pivot about a hollow axle 310 in response to pulling latch handle 302 thereby causing hook body 308 to translate (along the Y-axis) and, in response, decouple hook 312 from the mating pin. In various embodiments, the hollow axle 310 may be configured to receive a bolt which may couple the latch mechanism 304 to a cowl panel such as first cowl panel 202. In various embodiments, latch handle 302 may include a trigger mechanism 314. Trigger mechanism 314 comprises a trigger plate 316 set in an upper surface (relative to the Z-axis) 318 of the latch handle 302 and coupled to a trigger arm 320 which extends relatively perpendicular of the trigger plate inward (along the Z-axis) of the upper surface 318.

Trigger arm 320 may engage with a trigger bar which tends to retain upper surface 318 relatively proximate and flush with the aerodynamic panel surface 208. In response to actuating trigger mechanism 314 by depressing trigger plate 316, trigger arm 320 is decoupled from the trigger bar and a spring force F may be applied to latch handle 302. In response, latch handle 302 may tend to rotate about pivot pin 322 through an angle α defined by the translation of latch handle stop 324 within channel 326 and thereby dispose a portion of latch handle 302 including visibility features 400 relatively above aerodynamic panel surface 208. In this regard, actuating trigger mechanism 314 by depressing trigger plate 316 may tend to enable an operator to pull latch handle 302. In like regard, visibility features 400 may indicate latch mechanism 304 may be unlatched when exposed above (positive Z-axis) the aerodynamic panel surface 208. Stated another way, a portion of the latch handle comprising the visibility features 400 is further exposed in response to pulling (along the path of the arrow) latch handle 302 and transitioning the latch mechanism 304 from the latched state to the unlatched state.

In various embodiments, visibility features 400 may include a surface treatment applied to the first face 328 and/or the second face 330 to alter the optical surface contrast of the respective face relative to the latch handle 302 and/or the aerodynamic panel surface 208. In like regard, the surface treatment may alter the optical reflectivity of the respective face relative to the latch handle 302 and/or the aerodynamic panel surface 208. For example, the surface treatment may include a paint, an etch, a hard coat, an anodizing process, a dyeing process, a passivation process, a laser etch and/or ablation, or the like. In this regard, the visibility of panel latch 300 may be relatively enhanced.

Figure 4:
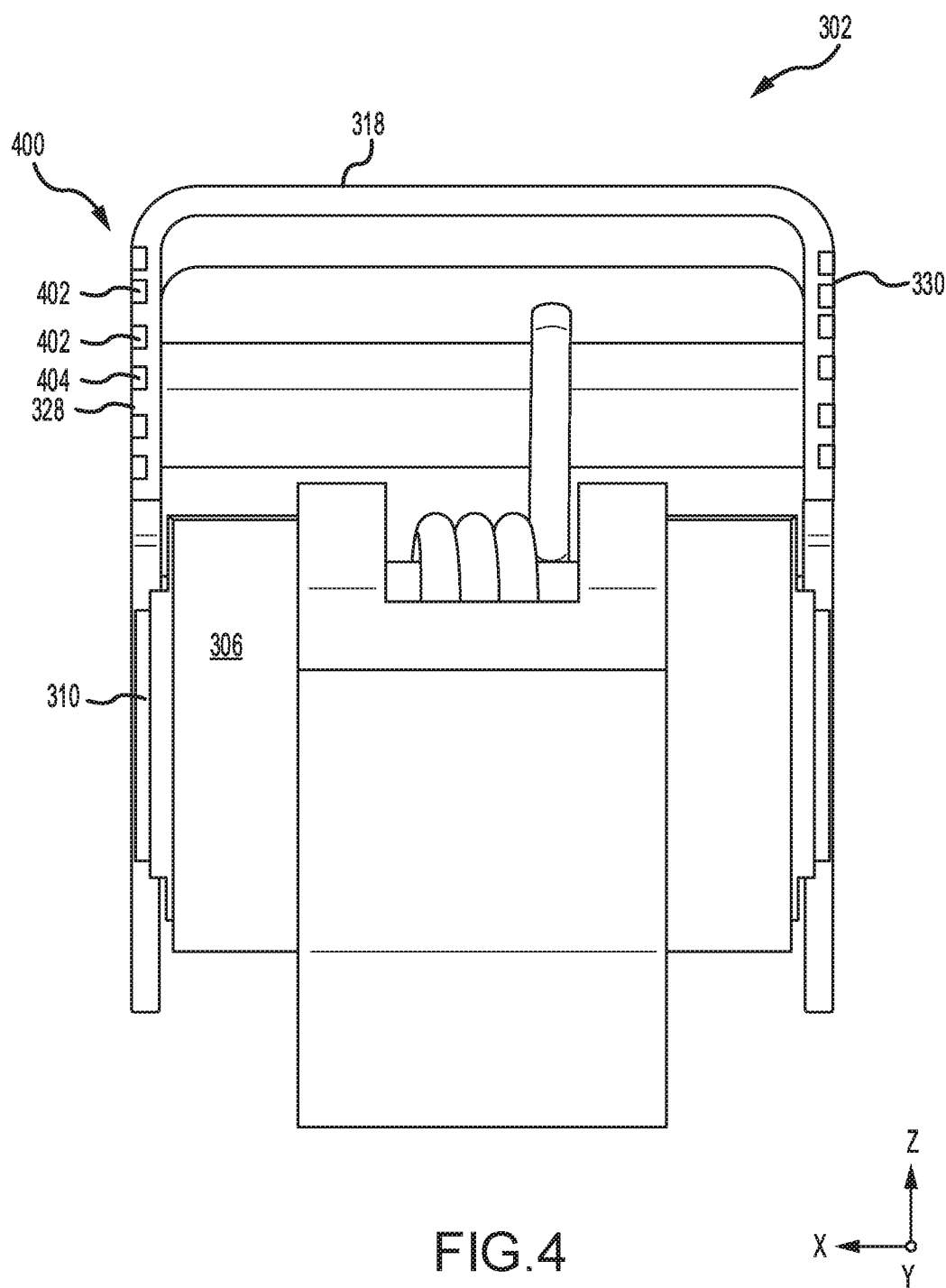
FIG. 4 illustrates visibility features of a high visibility panel latch, in accordance with various embodiments.
Figure 5A:
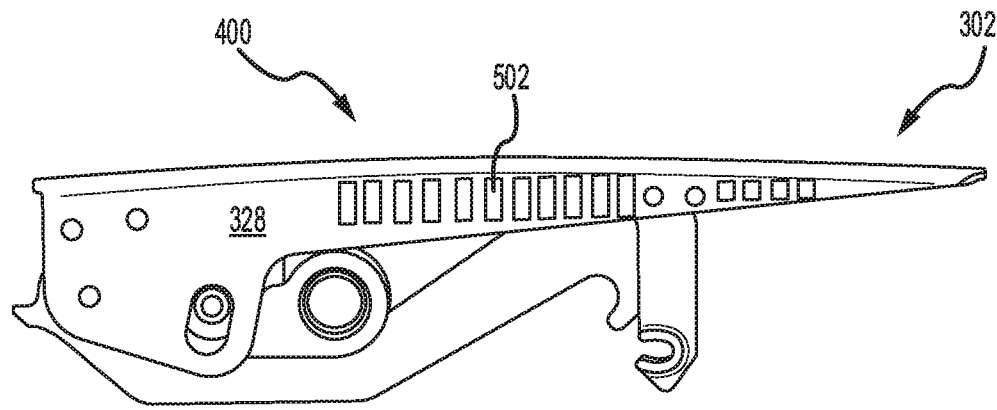
FIG. 5A illustrates visibility features of a high visibility panel latch, in accordance with various embodiments.
Figure 5B:
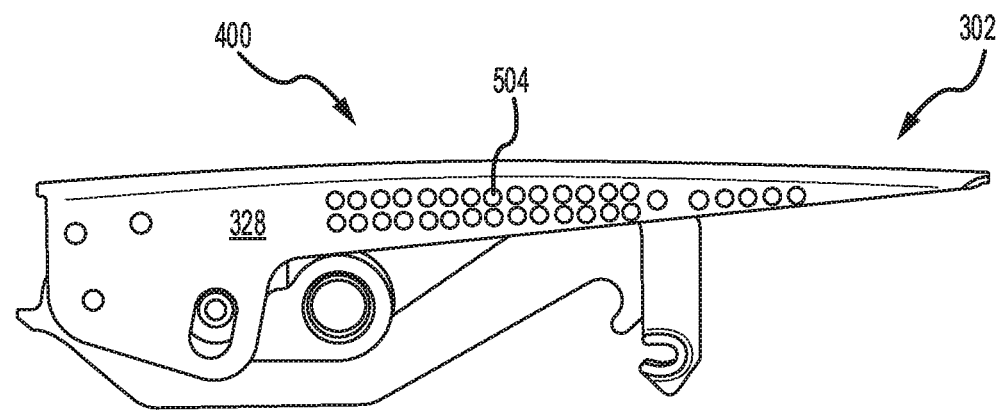
FIG. 5B illustrates visibility features of a high visibility panel latch, in accordance with various embodiments.
Figure 5C:
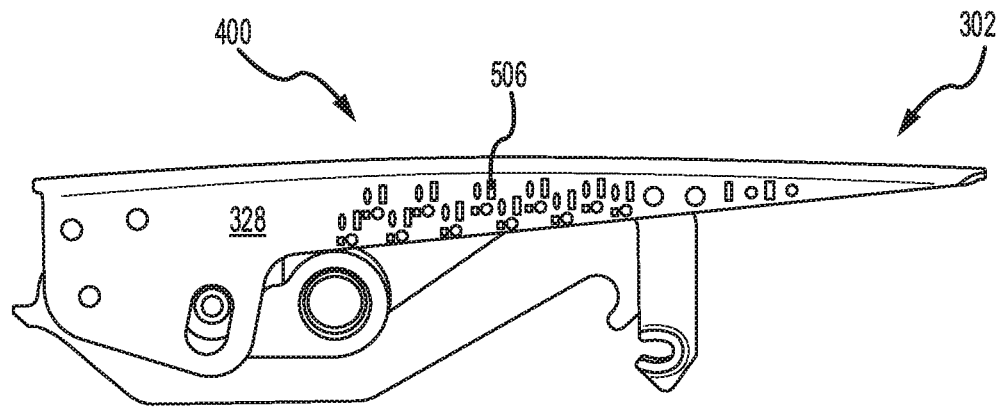
FIG. 5C illustrates visibility features of a high visibility panel latch, in accordance with various embodiments.
Figure 5D:
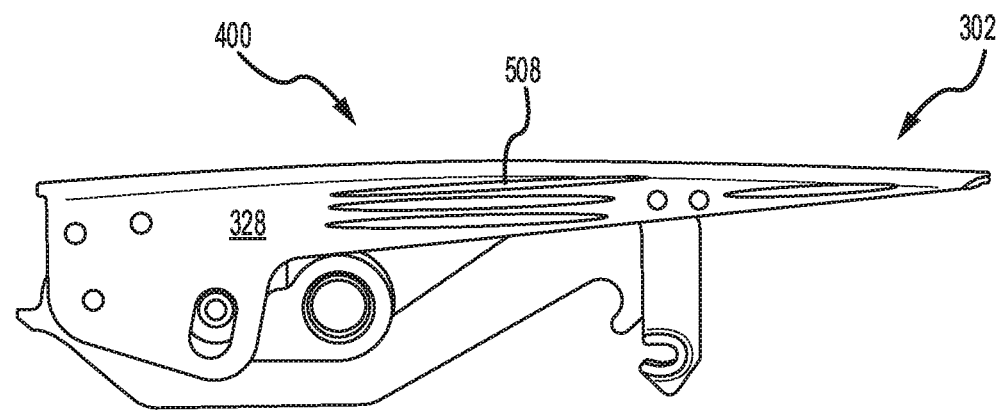
FIG. 5D illustrates visibility features of a high visibility panel latch, in accordance with various embodiments.

With additional reference to FIG. 4, visibility features 400 comprise a plurality of longitudinal channels 402 formed in the first face 328 and the second face 330 of latch handle 302. In various embodiments, visibility features 400 may be formed in upper surface 318 or may be formed in an interior surface of latch handle 302. Channels 402 may be relatively parallel to upper surface 318. In various embodiments, visibility features 400 such as channels 402 may be formed concurrently with latch handle 302 or may be formed as a part of a separate process to enhance the visual contrast of a latch handle. For example, handle 302 may be stamped from blank and visibility features 400 may be integrally stamped or may be pre-drilled, etched, or cut etc. into the blank. In various embodiments, a layer of paint 404 may be applied over the first face 328 and the second face 300. The layer of paint may be removed from the first face 328 tending thereby to leave paint 404 disposed within channels 402 and thereby tending to increase the visual contrast of channels 402 with respect to the respective face (328, 330) of latch handle 302. In various embodiments, a sealing layer may be applied over the paint 404 tending thereby to retain the paint 404 within the channels 402.

With additional reference to FIGS. 5A, 5B, 5C, and 5D visibility features 400 are shown in various alternative embodiments. Visibility features 400 may include a plurality of vertical (i.e., relatively perpendicular to upper surface 318) rectilinear channels 502 formed in the first face 328 and/or the second face 330 of latch handle 302. In various embodiments channels such as channels 402 and 502 may be formed at any angle relative to upper surface 318. Visibility features 400 may include circular features 504 in the first face 328 and/or the second face 330 of latch handle 302 such as, for example, an array of dots. Visibility features 400 may include a pattern 506 of shapes formed in the first face 328 and/or the second face 330 of latch handle 302. Visibility features 400 may include elliptical channels 508 in the first face 328 and/or the second face 330 of latch handle 302.

Figure 6A:
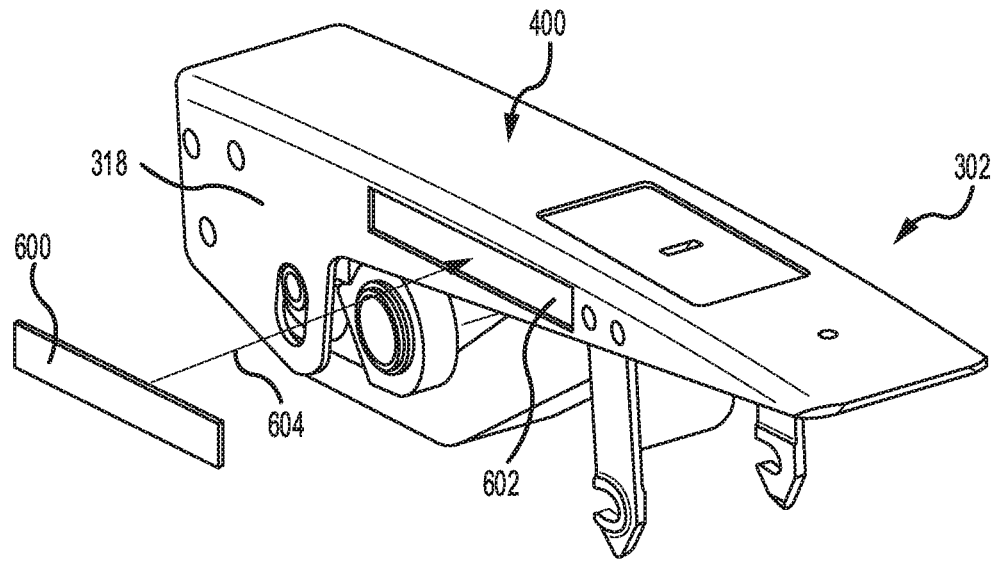
FIG. 6A illustrates visibility features of a high visibility panel latch, in accordance with various embodiments.
Figure 6B:
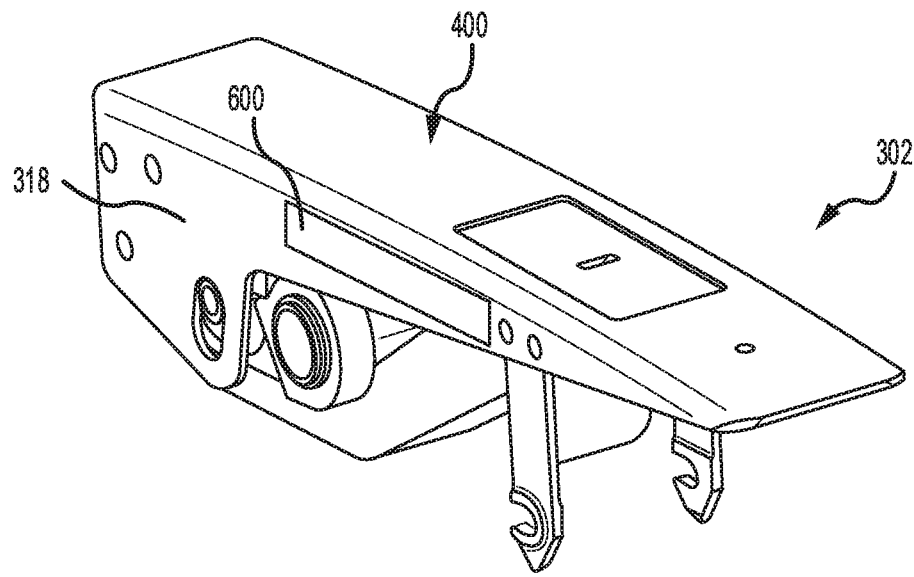
FIG. 6B illustrates visibility features of a high visibility panel latch, in accordance with various embodiments.

In various embodiments and with additional reference to FIGS. 6A and 6B, visibility features 400 include an insert material 600. An insert cutout 602 is formed in the first face 328 and/or the second face 330 of latch handle 302. Insert material 600 is inserted along arrow 604 into the insert cutout. In various embodiments, insert material 600 may be one of a plastic, an epoxy, a resin, a metal, a reflector, and/or any other suitable material tending to enhance visual contrast between the insert material and the respective face of the latch handle 302. In various embodiments, insert material 600 may be finished flush with a face such as first face 328. In various embodiments, insert material 600 may be mounted with fasteners, an adhesive, may be interference fit within insert cutout 602, and/or the like.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:

1. A high visibility panel latch, comprising:
   a latch mechanism; and
   a latch handle coupled to the latch mechanism, wherein the latch handle comprises a first face, a second face oriented away from the first face, an upper surface extending between the first face and the second face, and a visibility feature formed in at least one of the first face or the second face,
   wherein the latch mechanism includes a plurality of links configured to articulate a hook body, wherein the links pivot about an axle in response to pulling the latch handle,
   wherein the latch handle further comprises a trigger mechanism configured to expose the visibility feature relatively above an aerodynamic panel surface in response to depressing a trigger plate of the trigger mechanism,
   wherein the visibility feature is exposed above the aerodynamic panel surface in response to pulling the latch handle,
   wherein the visibility feature comprises at least one of a plurality of channels or a cutout formed in the at least one of the first face or the second face and a material configured to visually contrast with the at least one of the first face or the second face located in the at least one of the plurality of channels or the cutout.

2. The high visibility panel latch of claim 1, wherein the visibility feature comprises the plurality of channels, and wherein the material comprises a paint located in the plurality of channels.

3. The high visibility panel latch of claim 1, wherein the visibility feature comprises the plurality of channels, and wherein the plurality of channels comprises one or more circular shaped channels.

4. The high visibility panel latch of claim 1, wherein the visibility feature comprises the plurality of channels, and wherein the plurality of channels comprises a pattern of different shaped channels.

5. The high visibility panel latch of claim 1, wherein the visibility feature comprises the plurality of channels, and wherein the plurality of channels comprises one or more elliptical shaped channel.

6. The high visibility panel latch of claim 1, wherein the visibility feature comprises the insert cutout, and wherein the material comprises an insert material disposed within the insert cutout, the insert material being at least one of a plastic, an epoxy, a resin, a metal, or a reflector.

7. An engine nacelle comprising:
a first cowl panel;
a second cowl panel; and
a high visibility panel latch configured to removably couple the first cowl panel and the second cowl panel, the high visibility panel latch comprising:
a latch mechanism; and
a latch handle coupled to the latch mechanism, wherein the latch handle comprises a first face, a second face oriented away from the first face, an upper surface extending between the first face and the second face, and a visibility feature formed in at least one of the first face or the second face,
wherein the visibility feature is exposed above an aerodynamic panel surface in response to pulling the latch handle,
wherein the visibility feature comprises at least one of a plurality of channels or a cutout formed in the at least one of the first face or the second face and a material configured to visually contrast with the at least one of the first face or the second face located in the at least one of the plurality of channels or the cutout.

8. The engine nacelle of claim 7, wherein the latch mechanism includes a plurality of links configured to articulate a hook body, wherein the links pivot about an axle in response to pulling the latch handle, wherein the latch handle further comprises a trigger mechanism configured to expose a portion of the latch handle comprising the visibility feature relatively above the aerodynamic panel surface in response to depressing a trigger plate of the trigger mechanism.

9. The engine nacelle of claim 8, wherein the visibility feature comprises at least one of an etched portion, a hard coat, an anodized portion, a dyed portion, a passivated portion, or an ablated portion.

10. The engine nacelle of claim 8, wherein the visibility feature comprises the plurality of channels, and wherein the material comprises a paint located in the plurality of channels.

11. The engine nacelle of claim 8, wherein the visibility feature comprises the plurality of channels, and wherein the plurality of channels comprises one or more circular shaped channels.

12. The engine nacelle of claim 8, wherein the visibility feature comprises the plurality of channels, and wherein the plurality of channels comprises a pattern of different shaped channels.

13. The engine nacelle of claim 8, wherein the visibility feature comprises the plurality of channels, and wherein the plurality of channels comprises one or more elliptical shaped channels.

14. The engine nacelle of claim 8, wherein the visibility feature comprise the insert cutout, and wherein the material comprises an insert material disposed within the insert cutout.

15. An aircraft comprising:
an aerodynamic surface; and
a high visibility panel latch coupled to the aerodynamic surface, the high visibility panel latch comprising:
a latch mechanism; and
a latch handle coupled to the latch mechanism, wherein the latch handle comprises a first face, a second face oriented away from the first face, an upper surface extending between the first face and the second face, and a visibility feature formed in at least one of the first face or the second face,
wherein the first face and the second face are disposed relatively below the aerodynamic surface,
wherein in response to transitioning the latch mechanism from a latched state to an unlatched state the visibility feature is disposed relatively above the aerodynamic surface, and
wherein the visibility feature comprises at least one of a plurality of channels or a cutout formed in the at least one of the first face of the second face and a material configured to visually contrast with the at least one of the first face of the second face located in the at least one of the plurality of channels or the cutout.

16. The aircraft of claim 15, wherein the visibility feature comprises the plurality of channels, and wherein the material comprises a paint located in the plurality of channels.

17. The aircraft of claim 15, wherein the visibility feature comprises the plurality of channels, and wherein the plurality of channels comprises one or more circular shaped channels.

18. The aircraft of claim 15, wherein the visibility feature comprises the plurality of channels, and wherein the plurality of channels comprises a pattern of different shaped channels.

19. The aircraft of claim 15, wherein the visibility feature comprises the insert cutout, and wherein the material comprises an insert material disposed within the insert cutout, the insert material comprising at least one of a plastic, an epoxy, a resin, a metal, or a reflector.

* * * * *